June 25, 1929.  J. G. SWAIN  1,718,611
WHEEL STRUCTURE
Filed April 6, 1922
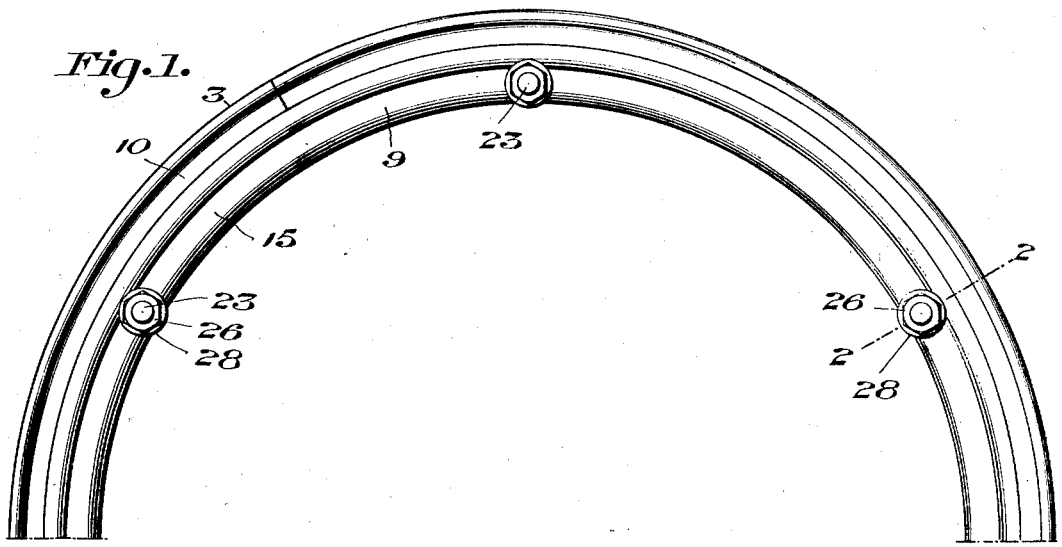
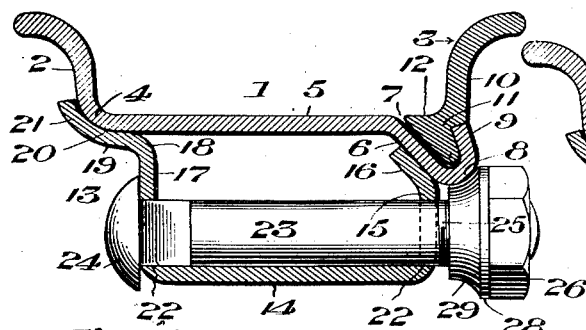
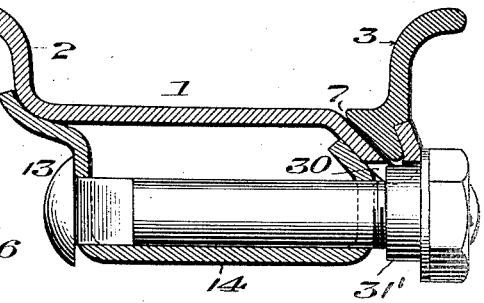
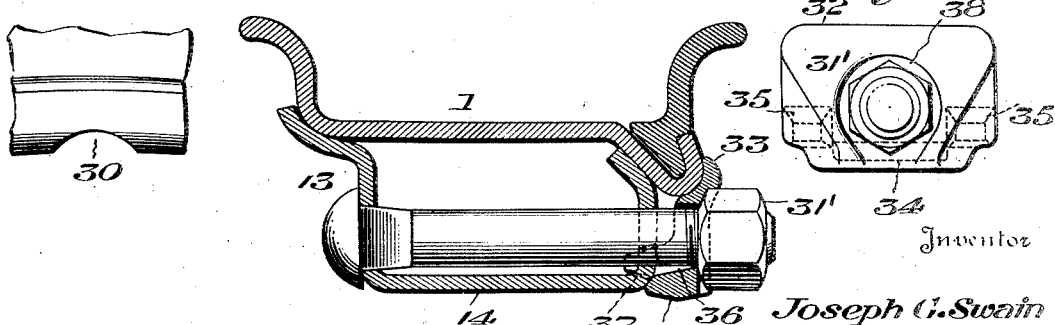
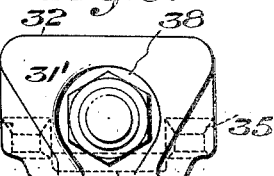
Inventor
Joseph G. Swain
By
Attorney Patented June 25, 1929.

1,718,611

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL STRUCTURE.

Application filed April 6, 1922. Serial No. 550,005.

My invention relates to improvements in wheel structures of the type including a demountable rim adapted for use with resilient tires.

The invention is particularly directed toward providing a metal felloe adapted for use in conjunction with certain specific forms of demountable rims, and which in combination with such rims will constitute a light practical and easily assembled unit when compared with existing structures now in use.

The invention also comprehends a structure which may be formed from a flat piece of stock by rolling it therefrom, and furthermore seeks to provide a more efficient and simplified form of locking means between the rim and the felloe than has heretofore been employed in connection with demountable rim structures.

With these and other objects in view as will appear from a perusal of the following description, the invention resides in the combination and arrangement of devices hereinafter set forth in detail, and particularly emphasized in the claims appended hereto.

In the drawings accompanying and forming a part of the specification:

Fig. 1 is a fragmentary side elevational view illustrating a preferred form of the invention, Fig. 2 is a transverse sectional view, on an enlarged scale, taken on the line 2—2 of Fig. 1.

Fig. 3 is a transverse sectional view, on an enlarged scale, illustrating a modification of the invention, Fig. 4 is a fragmentary view illustrating a detail of the structure shown in Fig. 3, Fig. 5 is a transverse sectional view, on an enlarged scale illustrating another modification of the invention, and Fig. 6 is a front elevational view of a detail of the structure shown in Fig. 5.

Referring to the drawings by numerals it will be seen that the rim annulus 1, forming a part of the combination of this invention, is of the type that is provided with an integral edge flange, and a split resilient ring 3. The flange 2 is vertically disposed and forms at its junction with the rim a rounded edge 4 at one side of the rim. From this round edge 4 the rim 1 is formed with a transversely flat tire supporting portion 5 that teminates at its opposite edge in an oblique portion 6 forming an obtuse angle with the flat portion 5 and projecting toward the center of the rim. This oblique portion, is, in cross-section, substantially straight and forms the inner wall of an edge channel 7 designed to receive the split ring 3. The oblique portion 6, at its extremity is curved laterally to provide a rounded bottom wall 8 for the channel 7, and terminates in an upstanding flange 9 that provides the outer wall of the channel. The outer wall or flange 9 is also obliquely disposed with respect to the flat portion 5 of the rim, but is nearer the vertical than said portion 6 whereby the channel 7 is substantially V shape in cross-section. The split resilient ring 3, per se forms no part of the present invention. It is sufficient to say that it comprises a vertically disposed flange adapted to seat at its base on the edge of the upstanding flange 9 and is provided with a laterally offset base portion 11 which, in cross-section is substantially of the same shape as the channel 7. The outer face 12 of the laterally offset portion 11 forms a continuation of the flat portion 5; for a purpose that will be apparent.

The felloe 13 is designed to support the before described rim by engagement principally with two portions thereof i. e. the portions 4 and 6. It comprises a transversely flat annulus 14 of less width than the rim 1 to which the spokes (not shown) of the wheel may be attached in any suitable manner. Upon this annulus the rim 1 is designed to be supported in spaced relation with respect thereto and in such manner that it may be readily removed therefrom in a lateral direction. To this end one edge of the annulus 14 is provided with a vertical, preferably integral, flange 15 that terminates in a relatively oblique portion 16 adapted for engagement with the oblique portion 6 of the rim. Preferably the outer edge of the flange 15 is bent laterally and inwardly to provide a portion of this character, whereby an annular seat for the portion 6 is formed that is offset relative to the flange 15. The opposite edge of the annulus, or felloe, is provided with a similar vertically disposed flange 17, but, of greater height than the flange 15. The flange 17 at its extremity is rounded as at 18 and provided with an offset portion 19 that projects outwardly and laterally in overhanging relation with respect to its edge of the annulus 14. Preferably, however, the portion 19 is shaped to provide in cross-section a transversely flat annular seating surface 20 for engagement with the inner face of the rim 1, and a transversely rounded seating edge 21 for engagement with the rounded portion 4 of the rim.

As a means of preventing relative movement of the rim and felloe, the flanges 15 and 17 are provided with apertures as at 22 disposed in transverse alignment to receive headed bolts 23, which are inserted therein with their heads 24 bearing against the flange 17. At its opposite end each bolt is threaded as at 25 to receive a nut 26, preferably of the form shown in Fig. 2. Here it is provided with a wrench engaging portion, a collar 28 and a substantially frustoconical shoulder 29 designed to bear against the rounded bottom portion 8 of the channel 7. Preferably the shoulder 29 is curved transversely to conform to the curvature of the portion 8 of the channel to insure a snug fit there-against.

If desired the rounded wall 8 of the channel 7 may be provided with notches 30 as shown in Fig. 3 and a transversely straight collar 31 be formed upon the nut 26. In this form of the invention the collar is adapted to be received in the notch 30 thereby additionally securing the rim and felloe against relative circumferential movement.

Again an ordinary nut 31' may be utilized in conjunction with a clamp 32 of the character shown in Figs. 5 and 6. The clamp 32 in this instance, is provided with a curvilinear tongue 33 constructed to fit flush with the bottom wall 8 of the channel, a laterally projecting flange 34 for engagement with the flange 15 of the felloe, and laterally projecting lugs 35 which are positioned upon each side of the bolt receiving opening 36. Apertures, one of which is shown at 37, are provided in the face of the flange 15 to receive the lugs 35 and the face of the clamp is provided with a countersink 38 to receive the nut 31'.

A felloe of the character described has been found to be well adapted for the purposes for which it was designed. It may be cold rolled from flat stock, which is a material advantage commercially, it is strong, possesses the required combination of flexibility and rigidity, and, together with the forms of fastening means previously described, forms an ideal structure for use in conjunction with the type of rim described herein.

It is to be understood, however, that the present disclosure is illustrative in character, and is not to be construed as limiting the scope or spirit of the invention unless such limitations are specifically indicated in the claims appended hereto.

Claims:

1. A wheel structure comprising in combination, a transversely flat tire supporting annulus provided at one edge with a vertical tire retaining flange and at its opposite edge with an inwardly projecting oblique portion, the said oblique portion being notched at spaced points along the inner periphery thereof, a felloe, a vertical flange at one edge of the felloe terminating in a laterally offset annulus adapted to seat said first edge of the tire supporting annulus, a vertical flange at the opposite edge of the felloe also terminating in a laterally offset annulus adapted to seat the oblique portion of the tire supporting annulus, and clamping means received within the said notches and adapted to clamp the oblique portion of the tire supporting annulus against its seat.

2. A wheel structure comprising in combination, a transversely flat tire supporting annulus provided at one edge thereof with an inwardly extending gutter having inclined side walls, the said walls being notched at spaced points, a felloe, a vertical flange at one edge of the felloe terminating in an annular offset seat arranged to engage one of the side walls, and removable clamps carried by the felloe adapted to enter the said notches and force the first named wall into seated position upon the vertical flange.

JOSEPH G. SWAIN.